United States Patent [19]
Severi

[11] Patent Number: 5,302,178
[45] Date of Patent: Apr. 12, 1994

[54] HARDENING FURNACE FOR SHEETS OF GLASS AND THE LIKE

[75] Inventor: Alberto Severi, Modena, Italy
[73] Assignee: Poppi S.p.A., Reggio Emilia, Italy
[21] Appl. No.: 837,065
[22] Filed: Feb. 18, 1992

[30] Foreign Application Priority Data

Mar. 8, 1991 [IT] Italy ............................ MO91A000033

[51] Int. Cl.$^5$ ...................... C03B 27/00; C03B 35/00; F27B 9/24
[52] U.S. Cl. ...................................... 65/350; 65/118; 65/356; 432/122; 432/148; 432/209; 432/246
[58] Field of Search ................. 65/356, 349, 350, 162, 65/118; 432/122, 148, 209, 246, 245, 249

[56] References Cited

U.S. PATENT DOCUMENTS

| | | | |
|---|---|---|---|
| 1,841,060 | 1/1932 | Russell | 65/118 |
| 2,151,983 | 3/1939 | Merrill | 65/349 |
| 2,220,582 | 11/1940 | Ruckstahl | 432/209 |
| 2,875,994 | 3/1959 | Mann | 432/148 |
| 2,949,869 | 8/1960 | Leeuwrik | 432/148 |
| 4,850,860 | 7/1989 | Albonetti | 432/209 |
| 5,022,911 | 6/1991 | Balestra | 65/349 |

Primary Examiner—W. Gary Jones
Assistant Examiner—Steven P. Griffin
Attorney, Agent, or Firm—Fay, Sharpe, Beall, Fagan, Minnich & McKee

[57] ABSTRACT

The invention relates to a hardening furnace, in particular for sheets of glass (2) and the like. In the furnace, the glass sheets (2) are sustained and transported by a conveyor plane (1) of the roller type above and beneath which plane an upper radiating surface (3) and a lower radiating surface (4) are arranged. The upper radiating surface (3) is composed of a plurality of longitudinal strips (31) arranged side-by-side and parallel to the movement direction of the plane (1), while the lower radiating surface (4) is constituted by a plurality of transversal strips (41) arranged transversally to the said movement direction. Each of the strips (31 and 41) is separated from the contiguous strips and represents the lower and upper walls of chambers (32 and 42) separated one from the other. In each said chamber (32 and 42) there is a device which confers regulatable thermal energy, for example, a radiating tube (15).

9 Claims, 3 Drawing Sheets

HARDENING FURNACE FOR SHEETS OF GLASS AND THE LIKE

BACKGROUND OF THE INVENTION

The invention relates to a hardening furnace, in particular for sheets of glass and the like.

The prior art embraces hardening furnaces equipped with a conveyor plane, generally having motorized rollers, which plane supports the sheets of glass, transports them and alternates the movement direction.

In such realizations, thermal energy is transferred to the sheets of glass usually by radiation by means such as electric resistance, radiating plates, always electrically powered, arranged above and below the conveyor plane in such a way as to cover the entire surface of both sides of the sheet of glass completely. An appropriate distribution of the means of radiation, combined with regulation of the energy source, permits regulating and dosing the flow of energy which hits, moment by moment, each point or zone of the surface occupied by the said conveyor plane on which the sheets of glass are moved. In particular, this permits dosing the energetic flow hitting the sheets of glass crossing the furnace both in longitudinal and in transverse directions in such a way as to realize uniform heating of the same sheets of glass. The possibility of control of the flow distribution on the conveyor or work plane, which depends essentially on the relative ease of regulation permitted by the electric energy source, permits treating, without drawbacks, loads of glass sheets which differ in size and dimensions both in tranverse and in longitudinal directions.

Such prior art realizations, with electric energy sources, are characterized by high energy costs.

SUMMARY OF THE INVENTION

The present invention, as it is characterized in the claims, provides a hardening furnace, in particular for glass sheets and the like, which is able to provide elevated characteristics of regulation possibilities and flexibility (possibility of treating in the same furnace loads of different transversal and longitudinal dimensions), but with reduced energy costs and, in any case, without the necessity of using an electrical energy source.

BRIEF DESCRIPTION OF THE DRAWINGS

Further characteristics will better emerge from the detailed description that follows, of a preferred but not exclusive embodiment of the invention, illustrated here purely in the form of a non-limiting example in the accompanying drawings, in which.

DESCRIPTION OF THE PREFERRED EMBODIMENTS

Figure 1:
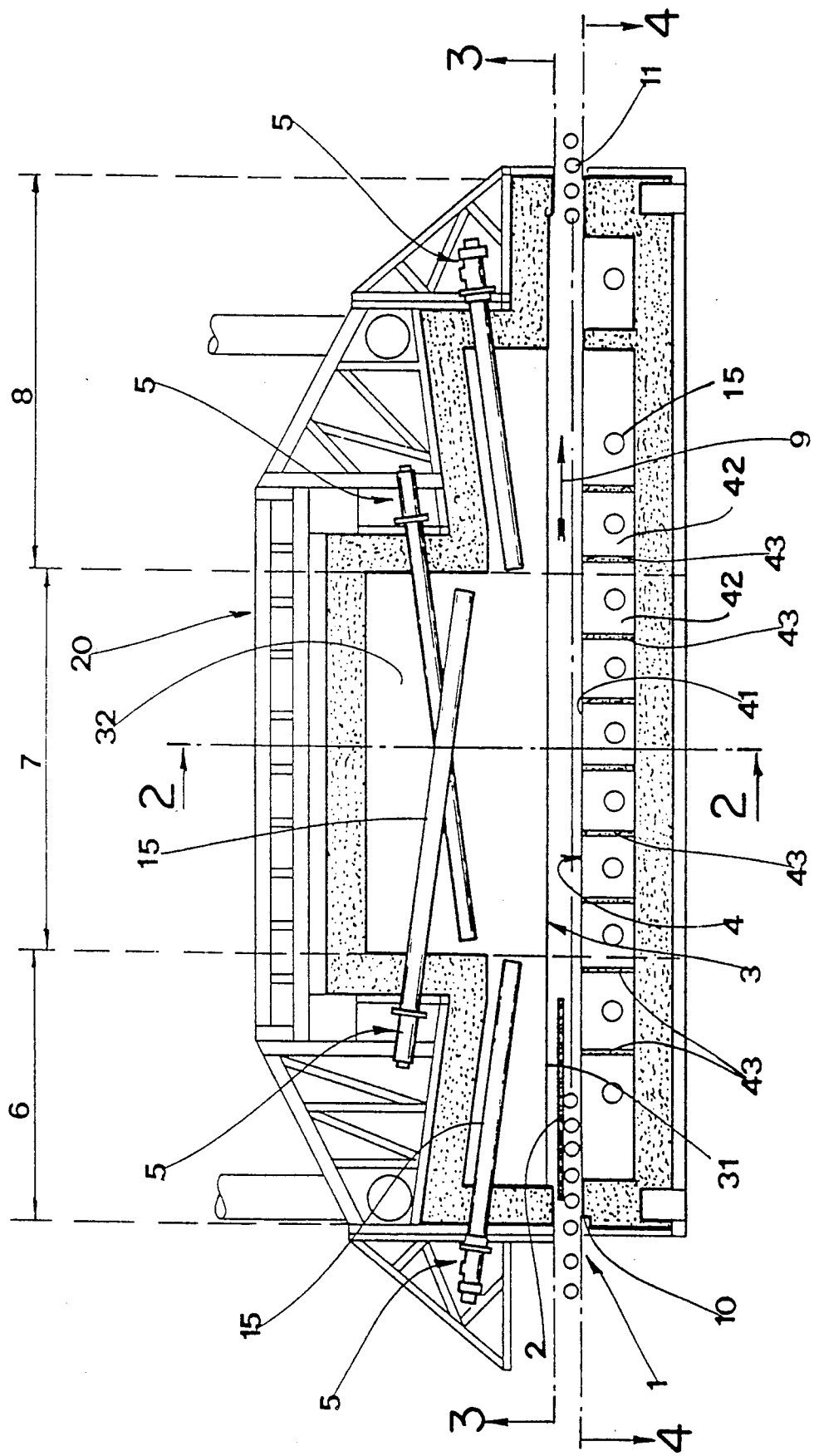
FIG. 1 shows a schematic longitudinal section made according to line 1—1 of FIG. 2.
Figure 2:
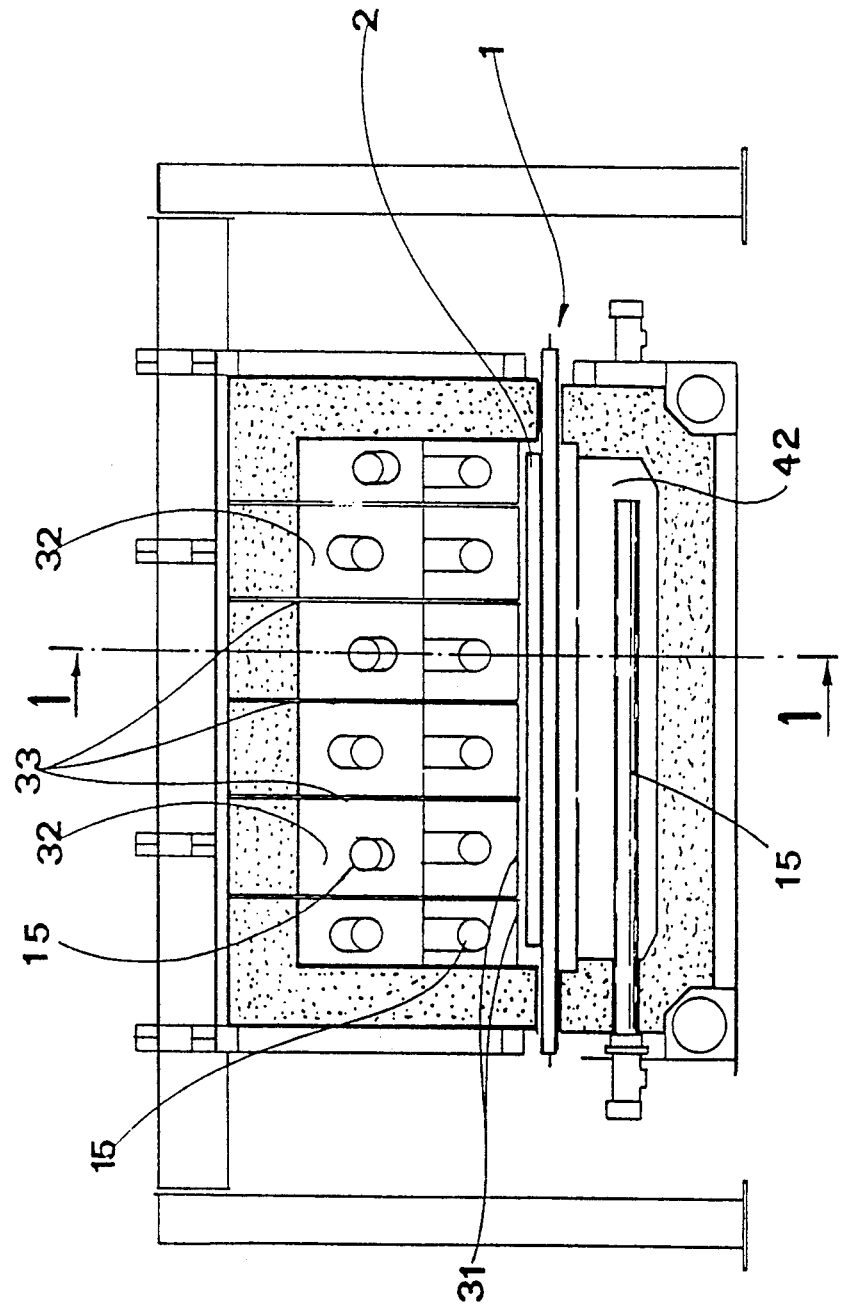
FIG. 2 shows a schematic section made along line 2—2 of FIG. 1.
Figure 3:
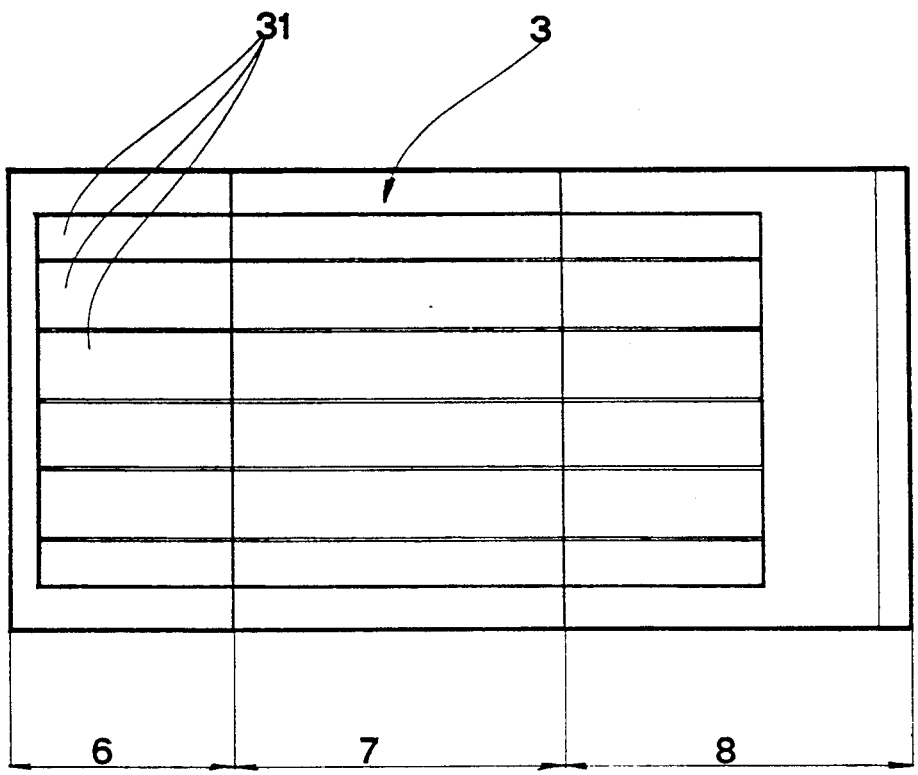
FIGS. 3 and 4 show two schematic sections made respectively along lines 3—3 and 4—4 of FIG. 1.
Figure 4:
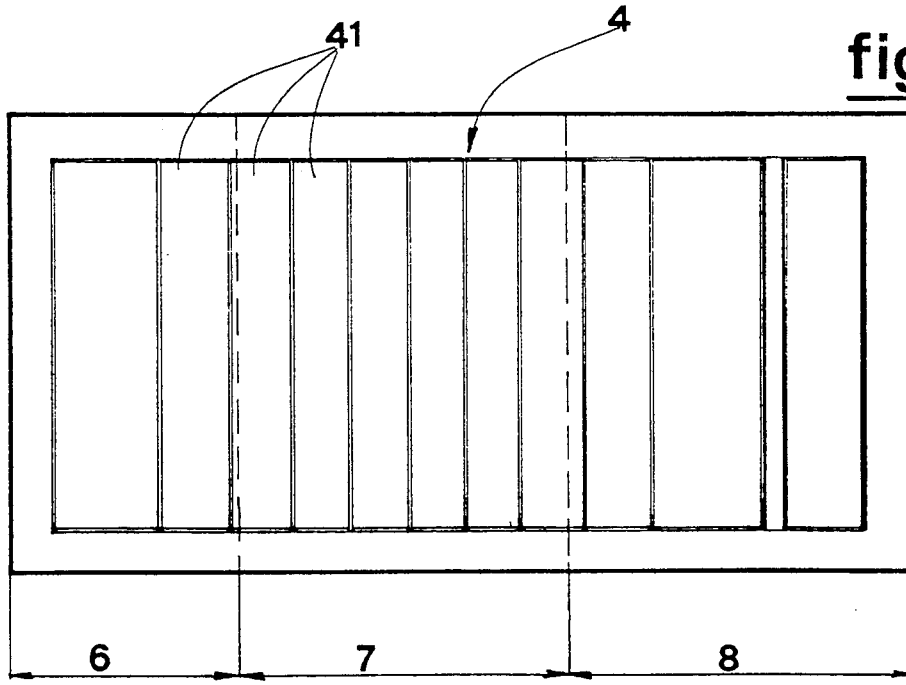

In the figures, 1 denotes a horizontal conveyor plane with motorized rollers aimed at sustaining and transferring sheets of glass 2, in the two directions and in a longitudinal direction perpendicular to the axes of the said rollers. The conveyor plane 1 is in part contained internally to a closed structure which presents, with reference to the movement direction of transfer of the said conveyor plane 1 indicated by the arrow 9, an inlet mouth 10 and an outlet mouth 11. Internal to the structure 20, arranged parallel to and at a short distance from the conveyor plane 1, is an upper radiating surface 3, formed by a plurality of longitudinal radiating plates or strips 31 oriented parallel to the movement direction indicated by the arrow 9. Said radiating strips 31 are subdivided in the longitudinal direction, that is, parallel to the arrow 9, into three groups which describe three zones in the furnace, 6, 7 and 8, consecutively arranged. In particular, each longitudinal strip 31 constitutes the lower part of a longitudinal chamber 32 which is separated from the corresponding longitudinal chambers of the contiguous strips 31 by means of vertical isolating walls 33. Internal to each chamber 32, a radiating tube 15 is arranged, with its axis longitudinal and parallel to the isolating walls, which isolating walls 33 describe the chamber. The radiating tube 15 belongs to a burner with self-recuperating recirculation powered by means of gaseous fuel. The radiating tube 15 extends over the entire length of the chamber 32 in which it is contained, and thus over the entire length of the strip 31.

In the illustrated embodiment, each zone of the furnace is constituted by a plurality of strips 31 arranged side-by side, each of which strips 31 represents the lower wall of a chamber 32 housing a radiating tube 15 of a burner 5. In the two end zones denoted by 6 and 8, which are located in opposite position with respect to the central zone 7 of greater length, the radiating tubes 15 housed, internal to the chambers 32, present their straight axes inclined with respect to the horizontal with a pre-established inclination in such a way that the parts which are nearest to the strips 31 are the respective non-constrained ends. The geometric arrangement of the burners 5 and the relative radiating tubes 15 in the two zones 6 and 8 is substantially symmetrical with respect to the central zone 7, just as the structure 20 of the furnace is symmetrical.

In the central zone, the radiating tubes 15 of the burners 5 are arranged alternately so that the radiating tubes 15 of two burners 5 located in two contiguous longitudinal chambers 32 have their respective non-constrained ends situated at the two opposite ends of the said central zone 7. Also in this case, the radiating tubes 15 are inclined, all with the same inclination with respect to the horizontal, in such a way that the relative non-constrained ends are the parts nearest to the strips 31, which all together form the radiating surface 3.

Beneath the conveyor plane 1, a lower radiating surface 4 is arranged, which, similar to the upper radiating surface 3, is formed by a plurality of transverse radiating strips 41 positioned side-by-side and arranged perpendicular to the movement direction of the conveyor plane 1 and, therefore, also to the axes of the motorized rollers of the same conveyor plane 1. Each transversal strip 41 constitutes the upper part, that is the part turned towards the plane 1 of a transversal chamber 42 which is separated from the corresponding transversal chambers 42 of the contiguous transversal strips 41 by means of isolating walls 43. In each chamber 42, a radiating tube 15 of a burner 5 is housed, the radiating tube 15 being of the self-recuperating recirculating type. Also in this case the radiating tube 15 extends over the entire length of the chamber 42.

By acting upon the controls and regulation of the single burner 5, it therefore becomes possible to control the energy flow to each of the strips 31 and 41 and thus it is possible to control and regulate the energy flow which hits the conveyor plane 1 in the zone beneath or above each strip 31 and 41.

In particular, in each of the zones 6, 7 and 8 of the furnace, by individual regulation of the single strips 31, obtainable by acting on the single burners 5, a pre-established temperature profile for each transversal section can be "designed" with regard to the temperature existing on the conveyor plane.

Analogously, the possibility of controlling each burner 5 housed in the chambers 42 singly permits constructing a desired temperature profile on the conveyor plane 1 according to a longitudinal section of the furnace. From the combined action of the strips 31 and the strips 41, the desired range of temperatures can be determined point-for-point over the conveyor plane 1 on which the sheets of glass 2 to be heated are arranged.

A further longitudinal-direction regulation possibility is provided by the inclination of the radiating tubes 15 in areas 6 and 8.

The abovesaid control and regulation capability permits working on loads of glass sheets which are very different among themselves with regard to transversal and longitudinal dimensions. The use of self-recuperating gas-fed burners grants a considerable saving in energy costs.

A further advantage of the invention is the ease with which it can be converted to a different form of energy source, by simple substitution of the radiating tubes 15 with analogous radiating elements using a different form of energy.

What is claimed is:

1. A hardening furnace comprising:
a conveyor plane (1) defined by means for supporting and transferring, selectively in two directions, in accordance with a pre-established longitudinal direction, sheets of glass (2);
an upper radiating surface (3), positioned above the conveyor plane (1), the upper radiating surface (3) being comprised of a plurality of longitudinal strips (31) arranged side-by-side and oriented parallel to the longitudinal direction of said plane (1), said longitudinal strips (31) being sub-divided, along the longitudinal direction, into at least three consecutive zones (6, 7 and 8) comprised of two end zones with a central zone between said two end zones;
a lower radiating surface (4) positioned beneath said plane (1), the lower radiating surface (4) being comprised of a plurality of transversal strips (41) arranged consecutively side-by-side and arranged transverse to the longitudinal direction of said plane (1);
a plurality of separate longitudinal chambers (32) located above said upper radiating surface, each longitudinal chamber (32) being defined by one of said longitudinal strips (31) and at least one corresponding longitudinal isolating wall of a plurality of longitudinal isolating walls (33);
a plurality of separate transversal chambers (42) located below said lower radiating surface, each transversal chamber (42) being defined by one of said transversal strips (41) and at least one corresponding transverse isolating wall of a plurality of transverse isolating walls (43);
at least one regulatable thermal energy supply device provided into each said longitudinal and transversal chamber (32) and (42) for supplying thermal energy to each of said longitudinal (31) or transversal (41) strips.

2. The furnace according to claim 1, wherein the glass sheet supporting and transferring means comprises a motorized-roller type conveyor plane.

3. The furnace according to claim 1, wherein the thermal energy supply devices comprise gaseous fuel burners (5) of a radiating tube type including means for providing self-recuperating recirculation.

4. The furnace according to claim 3, wherein the burners (5) are located internally of the longitudinal and transversal chambers (32 and 42) and are longitudinally disposed with respect to the longitudinal and transverse isolating walls (33 and 43).

5. The furnace according to claim 4, wherein each of the three consecutive zones of the furnace (6, 7 and 8) includes means for housing said burners (5) longitudinally disposed with respect to the longitudinal isolating walls, such burners (5) being arranged parallel to the longitudinal direction and parallel to the plurality of longitudinal isolating walls (33) which separate the longitudinal chambers (32).

6. The furnace according to claim 5, wherein each of the burners (5) longitudinally disposed with respect to the longitudinal isolating walls includes a radiating tube which extends from one said end zone of said three consecutive zones into said central zone (7) of said three consecutive zones, said radiating tubes are inclined with respect to a horizontal plane formed by the longitudinal strips (31), which constitute the upper radiating surface (3), in such a way that portions of the radiating tubes nearest the longitudinal strips are non-constrained, and further each said radiating tube (15) is housed in one longitudinal chamber (32) and arranged symmetrically with respect to a median plane perpendicular to the longitudinal direction of the conveyor plane (1).

7. The furnace according to claim 6, wherein the radiating tubes (15) of the burners (5) longitudinally disposed with respect to the longitudinal isolating walls are arranged alternately so that two radiating tubes (15) located in two contiguous longitudinal chambers (32) have their respective non-constrained ends situated at an opposite side of the central zone (7).

8. The furnace according to claim 5, wherein each of the burners (5) longitudinally disposed with respect to the longitudinal isolating walls includes a radiating tube extending therefrom and are inclined with respect to a horizontal plane with a preestablished inclination in such a way that non-constrained ends of respective radiating tubes are nearest to the longitudinal strips (31) which constitute the upper radiating surface (3).

9. The furnace according to claim 5, wherein each of the burners (5) longitudinally disposed with respect to the longitudinal isolating walls includes a radiating tube which extends from one said end zone of said three consecutive zones, said radiating tubes are inclined with respect to a horizontal plane formed by the longitudinal strips (31), which constitute the upper radiating surface (3), in such a way that portions of the radiating tubes nearest the longitudinal strips are non-constrained, and further each said radiating tube (15) is housed in one longitudinal chamber (32) and arranged symmetrically with respect to a median plane perpendicular to the longitudinal direction of the conveyor plane (1).

* * * * *